April 21, 1959 D. B. H. LUNDVALL 2,883,464

DEVICE FOR SIGNAL RECEIVERS

Filed Feb. 17, 1954

INVENTOR
DAN BJÖRN HJALMAR LUNDVALL
BY Frederick E. Hane
ATTORNEY 2,883,464

Patented Apr. 21, 1959

2,883,464

DEVICE FOR SIGNAL RECEIVERS

Dan Björn Hjalmar Lundvall, Hagersten, Sweden, assignor to Telefonaktiebolaget L M Ericsson, Stockholm, Sweden, a corporation of Sweden Application February 17, 1954, Serial No. 410,803

Claims priority, application Sweden February 18, 1953

4 Claims. (Cl. 179—15.5)

The present invention relates to a device for signal receivers in telecommunication systems to prevent the influence of disturbing currents, from the switchboard side in the form of clicks, buzzer tones, call signals, etc. which can cause false signals and disturb the function of the signal receiver.

The invention is particularly intended for multi-channel transmission systems of the carrier wave type in which the different calls are transmitted as the lower or upper sideband of a carrier wave which can either be suppressed or transmitted together with the sideband. In communication systems of this type, different kinds of call signals—such as ringing and hook signals, dial impulses etc.—are transmitted as audio-frequency currents, which can lie within or just outside the frequency band, which contains the transmission channel itself. The transmission of these currents is usually effected by means of relays, which convert the original D.C. or 20-cycle ringing signals, which are transmitted from the switchboard, into said audio-frequency currents. These currents are on the receiver side received by a signal receiver, which converts the audio-frequency currents into the original currents transmitted from the switchboard.

It is the principal object of the present invention to provide in a carrier wave type transmission system a circuit system blocking the transmission of false control signals which may cause disturbances backwards from the switchboard in the transmission system, that is, on the receiver side of the switchboard. This object of the invention and other objects, features and advantages which will be pointed out hereinafter are attained by providing a circuit system comprising a first demodulator responsive to the received signals to produce two output signals, one of which has a low frequency equal to the control frequency of the transmission system and the other a relatively high frequency, two filters connected to said demodulator in parallel, one of said filters being a low-pass filter passing said one frequency and rejecting the other and the other filter being a high-pass filter passing said other frequency and rejecting said one frequency, the output of the low-pass filter being connected to the switchboard. The circuit system further comprises a second demodulator connected to the output of the high-pass filter. The second demodulator is responsive to the received high frequency signals to produce two output signals, one of the output signals of the demodulator having a low frequency equal to the control signal frequency and the other a relatively high frequency. The signal receiver is connected through a second low-pass filter to the output of the second demodulator.

Figure 1:
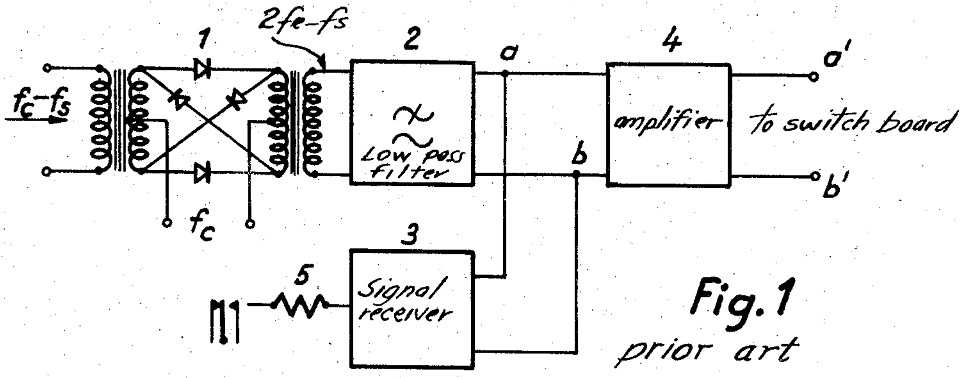
Figure 2:
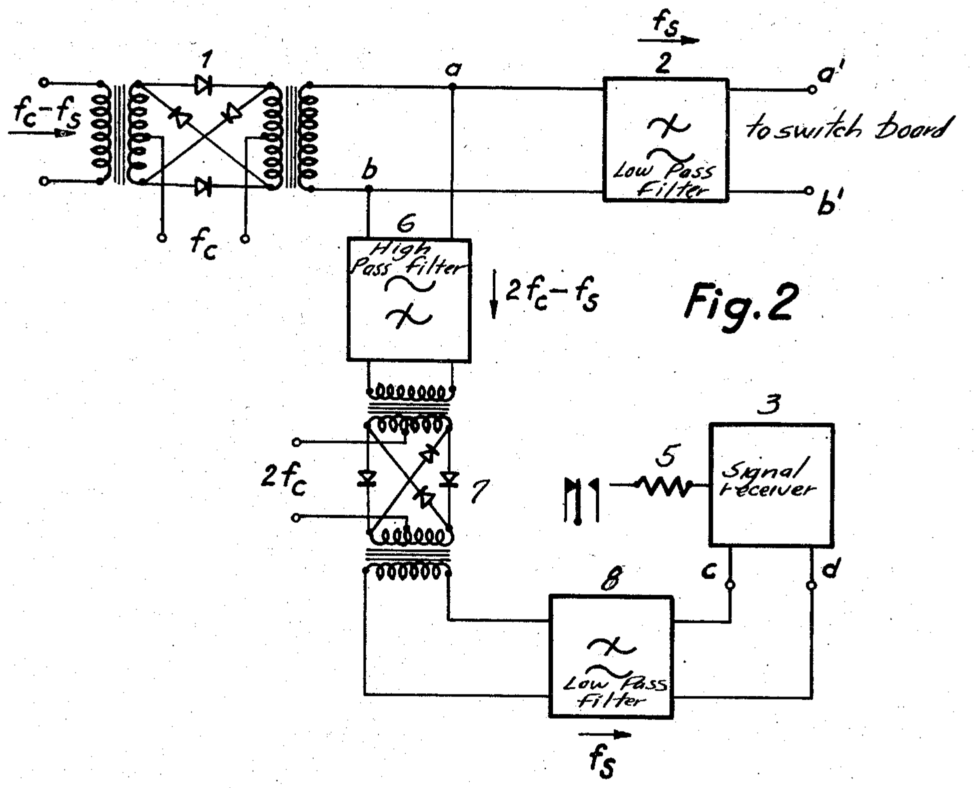

This invention will be further described in the following in connection with the attached drawing, in which Fig. 1 shows a signal receiver of well-known type and Fig. 2 shows a simplified performance of the invention.

A signal receiver of well-known type and the way of connecting the same is shown in Fig. 1. The figure shows schematically the receiver part of a carrier wave system.

A carrier frequency voltage $fc$ is connected to a demodulator of known type. It is assumed that the received modulated speech currents have the frequency $fc—fs$. In the demodulator are then preferably formed currents having the frequencies $fs$ and $2fc—fs$ which make the sideband frequencies at the demodulation of $fc–fs$ with the frequency $fc$. The currents having the frequency $2fc—fs$ are blocked in the low-pass filter 2, while those having the frequency $fs$ will pass and reach the point where the signal receiver 3 (T.M.) and the amplifier 4 are connected in parallel. A certain amount of these currents are amplified in the amplifier 4, which is dimensioned to amplify currents having frequencies lying in the speech frequency range. The amplified currents are then via the switchboard carried to the telephone subscriber. The remaining part of the currents having the frequency $fs$ is carried to the signal receiver 3. This is usually designed in such a way that the relay 5, which is connected to the same, is only influenced by currents having a certain frequency or frequencies, while the relay is not influenced by currents having other frequencies. Most often the receiver is also designed in such a way that it is not affected when it at the same time receives currents having a frequency which corresponds to the switching-on frequency and currents having another frequency.

The example shown can e.g. be the receiver part of a channel in a 12-channel system, whereby $fc$ has a frequency of 64 kilocycles per second and $fs$ 800 cycles per second. The received currents have then a frequency of 63,200 kilocycles per second. Currents having the frequency 800 cycles per second are obtained at the demodulation, and they pass the low-pass filter 2 which has a blocking range above 3600 cycles per second. The currents having a frequency of 800 cycles per second are amplified and supplied to the switchboard. For international connections 500 cycles per second is commonly used as the frequency for the currents which transmit call signals etc. from one switchboard to another within telecommunication systems of multi-channel type. The signal receivers are then designed to be influenced by currents having this frequency. In said example the signal receiver is, consequently, not affected by a signal having a frequency of 800 cycles per second. On the other hand, if $fs$ had had a frequency of 500 cycles per second, the relay 5 had functioned.

The important fact in the known device according to Fig. 1 is that the signal receiver 3 is connected to the input-side of the amplifier 4. Inasmuch as this amplifier contains vacuum tubes for the amplification of currents and, consequently, forms a one-way path from $a$, $b$ to $a'b'$, a very high attenuation is obtained from $a'b'$ to $a$, $b$ backwards through the amplifier for currents or voltages which are connected to $a'b'$. This means that the signal receiver 3 is not influenced by signals backwards from the switchboard.

The invention according to the following relates to another way of effecting this protection when for any reason the amplifier 4 is missing in the connection.

For the embodiment shown in Fig. 2 of a device according to the invention, the carrier frequency voltage $fc$ is connected to the demodulator 1. As in the previous case it is assumed that the received speech currents have the frequency $fc—fs$. Currents, preferably of the frequencies $fs$ and $2fc—fs$, are then formed in the demodulator. The low-pass filter 2 is as previously dimensioned to pass the currents having the frequency $fs$ which are supplied to the switchboard, but blocks those having the frequency $2fc—fs$. These will in their turn pass high-pass filter 6 which has a passband for these frequencies but a blocking band for currents having the frequency $fs$. This filter may consist of only a condenser. The currents having the frequency $2fc-fs$ are demodulated in a second demodulator 7 to which the carrier frequency $2fc$ has been supplied. Currents having the frequencies $fs$ and $4fc-fs$ are preferably obtained at the demodulation. The former frequencies pass the low-pass filter 8, while the latter frequencies are blocked. This filter may consist of only a coil or a resistor and a condenser. The currents having the frequency $fs$ are supplied to the signal receiver 3, which may be of the same type as the receiver described in Fig. 1.

In a practical example $fc$ can e.g. have a frequency of 64,000 kilocycles per second and $fs$ 800 cycles per second. At the demodulation in the demodulator 1 is then obtained $fs=800$ cycles per second and $2fc-fs=127,200$ kilocycles per second. The currents having a frequency of 800 cycles per second are carried through the low-pass filter 2, having a limiting frequency at 3600 cycles per second, to the switchboard. The currents having the frequency 127,200 kilocycles per second are carried via the high-pass filter 6, having a limiting frequency of 124,400 kilocycles per second, to the demodulator 7 in which the carrier frequency is $2fc=128,000$ kilocycles per second. The currents obtained at the demodulation have the frequencies 800 cycles per second and 255.2 kilocycles per second, whereby the first-mentioned pass the low-pass filter 8 and are supplied to the signal receiver.

The device in Fig. 2 made according to the invention has a very high attenuation between the terminal pairs *a'b'* to *c* and *d* for currents or voltages which are applied to the terminal pairs *a'b'*. Currents having frequencies lying within the pass-range of the low-pass filter 2 will always be blocked by the high-pass filter 6, as its limiting frequency always lies considerably higher than the limiting frequency of the low-pass filter 2. Currents having frequencies lying above the limiting frequency of this low-pass filter will naturally be blocked by the filter itself. Consequently, the input terminal pair *c, d* will always be effectively separated from the terminal pair *a'b'*.

From the chosen numerical example it is also evident that for correct dimensioning the frequency distance in the low-pass filter 2 becomes very great between the currents which are to be blocked or passed, respectively, through the high-pass filter 6 or vice versa, for which reason the filters can be made very simple and cheap. The same also applies to the filter 8.

Further, the carrier frequency voltage $2fc$, which is necessary for the demodulation in the demodulator 7, can be obtained from the carrier frequency voltage $fc$ through doubling by the aid of some known frequency-doubling coupling. Inversely, the carrier frequency voltage $fc$ for the demodulator 1 can naturally also be obtained from the carrier frequency voltage $2fc$ for the demodulator 7 by using some known frequency-halving coupling.

The invention is not limited to the simplified embodiment indicated above, but a number of detail modifications can be made within the scope of the invention.

I claim:

1. In a carrier wave type control signals transmission system, a circuit system for blocking the transmission of false control signals causing disturbances on the receiving side of a switchboard included in the transmission system, said circuit system comprising a first demodulator responsive to the received signals to produce two output signals, one of which has a low frequency approximately equal to the frequency of the control signals and the other a relatively high frequency, two filters connected to said demodulator in parallel, one of said filters being a low-pass filter passing said one frequency and rejecting the other and the other filter being a high-pass filter passing said other frequency and rejecting said one frequency, the output of the low-pass filter being connected to the switchboard, a second demodulator connected to the output of the high-pass filter, said second demodulator being responsive to received high frequency signals to produce two output signals, one of the output signals of said second demodulator having a low frequency approximately equal to the control signal frequency and the other a relatively high frequency, a second low-pass filter, and a signal receiver connected to the output of said second demodulator through said second low-pass filter.

2. A circuit system according to claim 1, wherein the first demodulator produces two signals, one of which has a frequency corresponding to the modulating frequency and the other of which has a frequency corresponding to approximately twice the carrier frequency of the received signal, and wherein the second demodulator produces two signals, one having a frequency corresponding to the modulating frequency of the received signal and the other a frequency approximately four times the frequency of said received carrier frequency.

3. A circuit system according to claim 1, wherein said second filter comprises a capacitor.

4. A circuit system according to claim 1, wherein said second filter includes a coil.

References Cited in the file of this patent

UNITED STATES PATENTS

| | | |
|---|---|---|
| 2,184,826 | Wiessner | Dec. 26, 1939 |
| 2,202,474 | Vroom | May 28, 1940 |
| 2,225,697 | Hussey | Dec. 24, 1940 |
| 2,264,396 | Moore | Dec. 2, 1941 |
| 2,270,385 | Skillman | Jan. 20, 1942 |
| 2,276,132 | Wiessner et al. | Mar. 10, 1942 |
| 2,546,994 | Frogmageot | Apr. 3, 1951 |
| 2,775,646 | Grosjean | Dec. 25, 1956 |